(12) United States Patent
Yamada et al.

(10) Patent No.: US 11,661,082 B2
(45) Date of Patent: May 30, 2023

(54) FORWARD MODELING FOR BEHAVIOR CONTROL OF AUTONOMOUS VEHICLES

(71) Applicant: GM GLOBAL TECHNOLOGY OPERATIONS LLC, Detroit, MI (US)

(72) Inventors: Kenji Yamada, Los Angeles, CA (US); Kyungnam Kim, Oak Park, CA (US); Rajan Bhattacharyya, Sherman Oaks, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 324 days.

(21) Appl. No.: 17/082,193

(22) Filed: Oct. 28, 2020

(65) Prior Publication Data

US 2022/0126861 A1    Apr. 28, 2022

(51) Int. Cl.
*B60W 60/00*    (2020.01)
*G06N 20/00*    (2019.01)

(52) U.S. Cl.
CPC .... *B60W 60/0011* (2020.02); *B60W 60/0027* (2020.02); *G06N 20/00* (2019.01); *B60W 2554/404* (2020.02); *B60W 2554/4029* (2020.02)

(58) Field of Classification Search
CPC ......... B60W 60/0011; B60W 60/0027; B60W 2554/4029; B60W 2554/404; G06N 20/00
See application file for complete search history.

(56) References Cited

U.S. PATENT DOCUMENTS

| | | | |
|---|---|---|---|
| 2019/0346851 A1* | 11/2019 | Liu | G05D 1/0217 |
| 2020/0249674 A1* | 8/2020 | Dally | G05D 1/0088 |
| 2020/0269871 A1* | 8/2020 | Schmidt | B60W 60/0011 |
| 2020/0326719 A1* | 10/2020 | Tram | G06N 3/006 |
| 2021/0253128 A1* | 8/2021 | Nister | B60W 50/0097 |
| 2021/0300348 A1* | 9/2021 | Yasui | B60W 60/0011 |
| 2021/0300350 A1* | 9/2021 | Yasui | B60W 30/0956 |
| 2022/0001892 A1* | 1/2022 | Fairley | G06N 20/10 |
| 2022/0048535 A1* | 2/2022 | Niendorf | G06N 20/00 |

* cited by examiner

*Primary Examiner* — Jelani A Smith
*Assistant Examiner* — Alyssa Rorie
(74) *Attorney, Agent, or Firm* — Vivacqua Crane PLLC

(57) ABSTRACT

A control system of the autonomous vehicle may generate multiple possible behavior control movements based on the driving goal and the assessment of the vehicle environment. In doing so, the method and system selects one of the best behavior control, among the multiple possible movements, and the selection is based on the quantitative grading of its driving behavior.

18 Claims, 2 Drawing Sheets

FORWARD MODELING FOR BEHAVIOR CONTROL OF AUTONOMOUS VEHICLES

INTRODUCTION

The present disclosure generally relates to autonomous vehicles, and more particularly, to systems and methods of forward modeling for behavior control of autonomous vehicles.

Autonomous vehicles are designed to operate without much interaction from a vehicle operator. These vehicles therefore include systems for controlling the vehicle's behavior.

SUMMARY

The present disclosure describes a system and method for behavior planning for autonomous driving. The movement of an autonomous vehicle is often planned in multiple stages, such as long-range route planning, mid-range path planning, lane planning, and short-range adaptive behavior planning to react to other moving objects or unexpected stationary objects. The presently disclosed system and method enable control of the mid-range and short range behavior, where the autonomous vehicle considers its path and lane planning, while taking the interaction with other vehicles into account.

The control system of the autonomous vehicle may generate multiple possible behavior control movements based on the driving goal and the assessment of the vehicle environment. In doing so, the presently disclosed method and system selects one of the best behavior control, among the multiple possible movements, and the selection is based on the quantitative grading of the vehicle driving behavior.

In an aspect of the present disclosure, a method for controlling an autonomous vehicle includes: receiving, by a controller of the autonomous vehicle, a sensor input from a plurality of sensors of the autonomous vehicle; determining a plurality of possible planned movements of the autonomous vehicle in a future using a plurality of autonomous driving techniques and the sensor input from the plurality of sensors; grading each of the plurality of possible planned movements to obtain a plurality of scores each corresponding to one of the plurality of possible planned movements, wherein the plurality of scores includes a highest score; selecting one of the plurality of possible planned movements that corresponds with the highest score of the plurality of scores; determining a predicted movement of at least one other vehicle based on the selected one of the plurality of possible planned movements; determining a plurality of possible reactive movements of the autonomous vehicle in the future based on the predicted movement of the at least one other vehicle; modifying the plurality of possible planned movements to include the plurality of possible reactive movements to obtain a plurality of modified planned movements in the future; regrading each of the plurality of modified planned movements to obtain a plurality of updated scores each corresponding to one of the plurality of modified planned movements, wherein the plurality of updated scores includes a highest updated score; selecting one of the plurality of modified planned movements that corresponds with the highest updated score of the plurality of scores; and commanding, by the controller, the autonomous vehicle to move according to the selected one of the plurality of modified planned movements with the highest updated score.

The plurality of autonomous driving techniques may include a rule-based model and/or a machine learning tree-regression model. Grading each of the possible planned movements may include determining a speed of the autonomous vehicle for each of the plurality of possible planned movements, a distance from the autonomous vehicle to another object for each of the plurality of planned movements, a presence of a stop sign for each of the plurality of planned movements, a distance from the autonomous vehicle to the stop sign for each of the plurality of planned movements, a presence of a pedestrian for each of the plurality of planned movements, and a distance from the autonomous vehicle to the pedestrian for each of the plurality of planned movements.

Grading each of the possible planned movements may include assigning a partial score to each of the speed of the autonomous vehicle for each of the plurality of planned movements, the distance from the autonomous vehicle to another object for each of the plurality of planned movements, the presence of the stop sign for each of the plurality of planned movements, the distance from the autonomous vehicle to the stop sign for each of the plurality of planned movements, the presence of a pedestrian for each of the plurality of planned movements, and the distance from the autonomous vehicle to the pedestrian for each of the plurality of planned movements in order to obtain a plurality of partial movement scores for each of the plurality of planned movements.

Each of the plurality of scores may be determined as a function of the plurality of partial movement scores. Regrading each of the plurality of planned movements may include determining an updated speed of the autonomous vehicle for each of the plurality of modified planned movements, an updated distance from the autonomous vehicle to another object for each of the plurality of modified planned movements, an updated presence of a stop sign for each of the plurality of modified planned movements, an updated distance from the autonomous vehicle to the stop sign for each of the plurality of modified planned movements, an updated presence of a pedestrian for each of the plurality of modified planned movements, and an updated distance from the autonomous vehicle to the pedestrian for each of the plurality of modified planned movements.

Regrading each of the possible modified movements includes assigning an updated partial score to each of the updated speed of the autonomous vehicle for each of the plurality of modified planned movements, the updated distance from the autonomous vehicle to another object for each of the plurality of modified planned movements, the updated presence of the stop sign for each of the plurality of modified planned movements, the updated distance from the autonomous vehicle to the stop sign for each of the plurality of modified planned movements, the updated presence of a pedestrian for each of the plurality of modified planned movements, and the updated distance from the autonomous vehicle to the pedestrian for each of the plurality of modified planned movements in order to obtain a plurality of partial modified scores for each of the plurality of modified planned movements. The future may be 3.5 seconds ahead of a current time. The predicted movement of at least one other vehicle may be determined using a kinematic prediction model.

The present disclosure also describes a control system for an autonomous vehicle. In an aspect of the present disclosure, the control system includes a plurality of sensors and a controller in communication with the plurality of sensors. The controller is programmed to: receive input from a plurality of sensors of the autonomous vehicle; determine a plurality of possible planned movements of the autonomous vehicle in a future using a plurality of autonomous driving techniques and input from the plurality of sensors; grade each of the plurality of possible planned movements to obtain a plurality of scores each corresponding to one of the plurality of possible planned movements, wherein the plurality of scores includes a highest score; select one of the plurality of the possible planned movements that corresponds with the highest score of the plurality of scores; determine a predicted movement of at least one other vehicle based on the selected one of the plurality of possible planned movements; determine a plurality of possible reactive movements of the autonomous vehicle in the future based on the predicted movement of the at least one other vehicle; modify the plurality of possible planned movements to include the plurality of possible reactive movements to obtain a plurality of modified planned movements in the future; regrade each of the plurality of modified planned movements to obtain a plurality of updated scores each corresponding to one of the plurality of modified planned movements, wherein the plurality of updated scores includes a highest updated score; and select one of the plurality of modified planned movements that corresponds with the highest updated score of the plurality of scores; and command the autonomous vehicle to move according to the selected one of the plurality of modified planned movements with the highest updated score.

The plurality of autonomous driving techniques may include a rule-based model and/or a machine learning tree-regression model. The controller grades each of the possible planned movements by determining a speed of the autonomous vehicle for each of the plurality of possible planned movements, a distance from the autonomous vehicle to another object for each of the plurality of planned movements, a presence of a stop sign for each of the plurality of planned movements, a distance from the autonomous vehicle to the stop sign for each of the plurality of planned movements, a presence of a pedestrian for each of the plurality of planned movements, and a distance from the autonomous vehicle to the pedestrian for each of the plurality of planned movements.

Grading each of the possible planned movements includes assigning a partial score to each of the speed of the autonomous vehicle for each of the plurality of planned movements, the distance from the autonomous vehicle to another object for each of the plurality of planned movements, the presence of the stop sign for each of the plurality of planned movements, the distance from the autonomous vehicle to the stop sign for each of the plurality of planned movements, the presence of a pedestrian for each of the plurality of planned movements, and the distance from the autonomous vehicle to the pedestrian for each of the plurality of planned movements in order to obtain a plurality of partial movement scores for each of the plurality of planned movements.

Each of the plurality of scores may be a function of the plurality of partial movement scores. Regrading each of the plurality of planned movements may include determining an updated speed of the autonomous vehicle for each of the plurality of modified planned movements, an updated distance from the autonomous vehicle to another object for each of the plurality of modified planned movements, an updated presence of a stop sign for each of the plurality of modified planned movements, an updated distance from the autonomous vehicle to the stop sign for each of the plurality of modified planned movements, an updated presence of a pedestrian for each of the plurality of modified planned movements, and an updated distance from the autonomous vehicle to the pedestrian for each of the plurality of modified planned movements.

Regrading each of the possible modified movements may include assigning an updated partial score to each of the updated speed of the autonomous vehicle for each of the plurality of modified planned movements, the updated distance from the autonomous vehicle to another object for each of the plurality of modified planned movements, the updated presence of the stop sign for each of the plurality of modified planned movements, the updated distance from the autonomous vehicle to the stop sign for each of the plurality of modified planned movements, the updated presence of a pedestrian for each of the plurality of modified planned movements, and the updated distance from the autonomous vehicle to the pedestrian for each of the plurality of modified planned movements in order to obtain a plurality of partial modified scores for each of the plurality of modified planned movements.

The future may be 3.5 seconds ahead of a current time. The predicted movement of at least one other vehicle may be determined using a kinematic prediction model.

The above features and advantages and other features and advantages of the present teachings are readily apparent from the following detailed description of the best modes for carrying out the teachings when taken in connection with the accompanying drawings.

DETAILED DESCRIPTION

The following detailed description is merely exemplary in nature and is not intended to limit the application and uses. Furthermore, there is no intention to be bound by expressed or implied theory presented in the preceding technical field, background, brief summary, or the following detailed description. As used herein, the term "module" refers to hardware, software, firmware, electronic control component, processing logic, and/or processor device, individually or in combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

Figure 1:
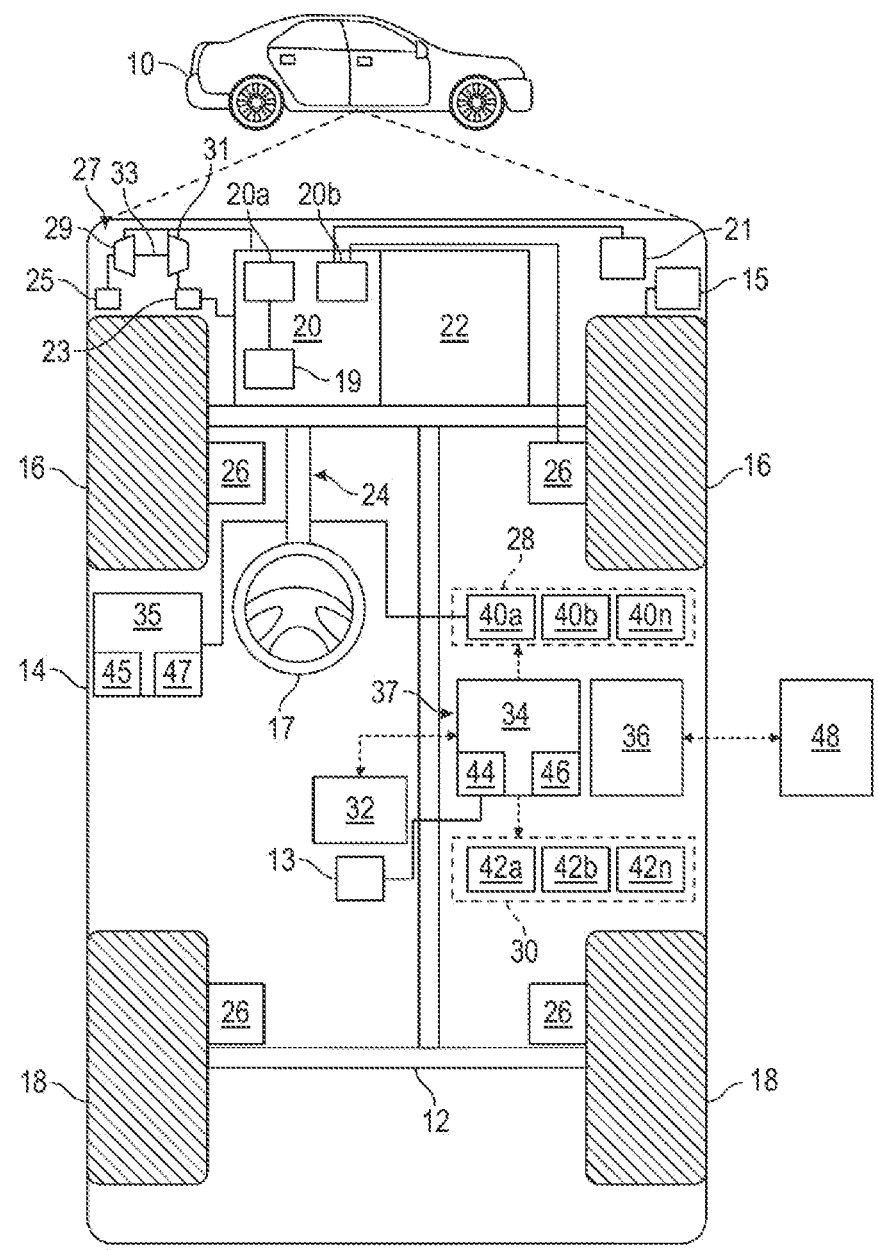
FIG. 1 is a functional block diagram illustrating a vehicle.

With reference to FIG. 1, an autonomous vehicle 10 includes a chassis 12, a body 14, front wheels 16, and rear wheels 18. The body 14 is arranged on the chassis 12 and substantially encloses components of the autonomous vehicle 10. The body 14 and the chassis 12 may jointly form a frame. The front wheels 16 and rear wheels 18 are each rotationally coupled to the chassis 12 near a respective corner of the body 14. The vehicle 10 is, for example, a vehicle that is automatically controlled to carry passengers from one location to another. The vehicle 10 is depicted in the illustrated embodiment as a passenger car, but it should be appreciated that other vehicle, including motorcycles, trucks, sport utility vehicles (SUVs), recreational vehicles (RVs), marine vessels, aircraft, and the like, can also be used. Further, the vehicle 10 may be an electric vehicle, a hybrid vehicle, or an engine vehicle.

The vehicle 10 may correspond to a level four or level five automation system (or lower levels as long as the driver's hand are not on the steering wheel 17) under the Society of Automotive Engineers (SAE) "J3016" standard taxonomy of automated driving levels. Using this terminology, a level four system indicates "high automation," referring to a driving mode in which the automated driving system performs aspects of the dynamic driving task, even if a human driver does not respond appropriately to a request to intervene. A level five system, on the other hand, indicates "full automation," referring to a driving mode in which the automated driving system performs aspects of the dynamic driving task under roadway and environmental conditions that can be managed by a human driver. It will be appreciated, however, the embodiments in accordance with the present subject matter are not limited to a particular taxonomy or rubric of automation categories. Furthermore, systems in accordance with the present embodiment may be used in conjunction with an autonomous or other vehicle that utilizes a navigation system and/or other systems to provide route guidance and/or implementation.

The vehicle 10 may generally include a propulsion system 20, a transmission system 22, an electronic power steering system 24, a regenerative braking system 26, a sensor system 28, an actuator system 30, at least one data storage device 32, at least one automated system processor 44, and a communication system 36. The propulsion system 20, the transmission system 22, and the regenerative braking system 26 are part of the powertrain of the vehicle 10. The propulsion system 20 may include an internal combustion engine 20a and/or an electric machine 20b such as an electric motor/generator, a traction motor, and/or a fuel cell propulsion system. The internal combustion engine 20a may be controlled by an engine control unit 19. The engine control unit 19 may include an engine controller and a computer-readable medium collectively programmed to control the internal combustion engine 20a. The electric machine 20b is configured to operate as an electric motor to convert electrical energy into mechanical energy (e.g., torque). Additionally, the electric machine 20b is configured to operate as an electric generator to convert mechanical energy (e.g., torque) into electrical energy. The vehicle 10 also includes an energy storage system (ESS) 21 configured to store electrical energy. The ESS 21 is electrically connected to the electric machine 20b and therefore supplies electrical energy to the electric machine 20b. The transmission system 22 is configured to transmit power from the propulsion system 20 to the vehicle wheels 16 and 18 according to selectable speed ratios. The transmission system 22 may include a step-ratio automatic transmission, a continuously-variable transmission, or other appropriate transmission.

The vehicle 10 further includes an exhaust system 23 in fluid communication with the internal combustion engine 20a and may include an exhaust manifold. After combustion in the internal combustion engine 20a, the exhaust system 23 receives and guides the exhaust gases produced by the internal combustion engine 20a. The exhaust system 23 may include one or more valves to guide the exhaust gases.

The vehicle 10 further includes an intake assembly 25 for supplying air to the internal combustion engine 20a. The intake assembly 25 may include an intake manifold and is configured to receive air from the atmosphere and guide that air into the internal combustion engine 20a. The air is then mixed with fuel and combusted in the internal combustion engine 20a.

The vehicle 10 may further includes a turbocharger 27 in fluid communication with the intake assembly 25 and the exhaust system 23. Specifically, the turbocharger 27 includes a compressor 29, a turbine 31, and a shaft 33 rotatably interconnecting the compressor 29 and the turbine 31. During operation, the compressor 29 compresses the airflow before it enters internal combustion engine 20a in order to increase power and efficiency. Accordingly, the compressor 29 is in fluid communication with the intake assembly 25. The compressor 29 forces more air and, thus, more oxygen into the combustion chambers of the internal combustion engine 20a than is otherwise achievable with ambient atmospheric pressure. The compressor 29 is driven by the turbine 31 through the shaft 33. Thus, rotating the turbine 31 causes the compressor 29 to rotate. To rotate the turbine 31, exhaust gases from the exhaust system 23 are forced into the turbine 31. The buildup of exhaust gas pressure drives the turbine 31. Exhaust gas pressure when the internal combustion engine 20a is idle, operates at low engine speeds, or operates with low throttle that is usually insufficient to drive the turbine 31.

As discussed above, the vehicle 10 may include the regenerative braking systems 26, which are coupled to the vehicle wheels 16 and 18 and are therefore configured to provide braking torque to the vehicle wheels 16 and 18. The regenerative brake system 26 is configured to reduce the vehicle speed or bring the vehicle 10 to a stop. The regenerative braking system 26 is electrically connected to the electric machine 20b. As such, regenerative braking causes the electric machine 20b to operate as a generator to convert rotational energy from the vehicle wheels 16 and 18 to electrical power that is used to charge the energy storage system 21.

The electronic power steering system 24 influences a position of the vehicle wheels 16 and/or 18. While depicted as including a steering wheel 17 for illustrative purposes, the electronic power steering system 24 may not include a steering wheel. The vehicle 10 may further include an electronic stability control system 15 (or other vehicle control system) that helps drivers maintain control of their vehicle 10 during extreme steering maneuvers by keeping the vehicle 10 headed in the driver's intended direction, even when the vehicle 10 nears or exceeds the limits of road traction.

The sensor system 28 includes one or more sensing devices 40a-40n that sense observable conditions of the exterior environment and/or the interior environment of the vehicle 10. The sensing devices 40a-40n may be referred to as sensors and may include, but are not limited to, radars, lidars, global positioning systems, optical cameras, thermal cameras, ultrasonic sensors, image sensors, yaw rate sensors, and/or other sensors. For example, the sensing device 40a is a forward camera module (FCM) configured to capture images in the front of the vehicle 10 and generate image data indicative of the captured images. The FCM (i.e., sensing device 40a) is in communication with the automated system controller 34 and may therefore receive commands from the automated system controller 34. The FCM (i.e., sensing device 40a) is also configured to send the image data to the automated system controller 34. In the depicted embodiment, the sensing device 40b is a lidar system configured to measure the distance from the vehicle 10 to another object, such as another vehicle. The lidar system (i.e., sensing device 40b) is in communication with the automated system controller 34. The automated system controller 34 may therefore receive signals from the sensing device 40b and determine the distance from the vehicle 10 to another object based on the signal received from the sensing device 40b. The sensing device 40n may be a speedometer configured to measure the current vehicle speed of the vehicle 10. The speedometer (i.e., sensing device 40n) is in communication with the automated system controller 34. The automated system controller 34 is programmed to receive signals from the sensing device 40n and determine the current vehicle speed of the vehicle 10 based on the signals received from the sensing device 40n. The automated system controller 34 may be part of an automated control system 37 configured to autonomously control movements of the vehicle 10. The vehicle 10 further includes a user-interface 13 in communication with the automated control system 37. The vehicle operator may select between an autonomous control mode and a driver-operated mode through the user-interface. In the autonomous control mode, the automated control system 37 controls the movements of the vehicle 10. In the driver-operated mode, the vehicle operator controls the movements of the vehicle 10.

One of the sensing devices 40a-40n may be a steering sensor configured to measure the steering angle of the electronic power system 24. The steering sensor may be part of the electronic power steering system 24 and may be referred to as sensor. The steering sensor (i.e., at least one of the sensing devices 40a-40n) may be a yaw rate sensor and/or an image sensor each configured to indirectly measure the steering angle of the autonomous vehicle 10. The image sensor may be a charge-coupled device (CCD) and/or an active-pixel sensor (CMOS sensor). Regardless of the type of sensor, the image sensor may be part of a forward camera module (i.e., sensing device 40a). However, the steering sensor (i.e., one of the sensing devices 40a-40n) is not a steering wheel angle sensor to avoid introducing additional bias to the steering angle measurement. Therefore, the electric power steering system does not necessarily include a steering wheel angle sensor.

The actuator system 30 includes one or more actuator devices 42a, 42b, and 42n that control one or more vehicle features of the vehicle 10. The actuator devices 42a, 42b, 42n (also referred to as the actuators) control one or more features such as, but not limited to, the propulsion system 20, the transmission system 22, the electronic power steering system 24, the regenerative brake system 26, and actuators for opening and closing the doors of the vehicle 10. In various embodiments, vehicle 10 may also include interior and/or exterior vehicle features not illustrated in FIG. 1, such as a trunk, and cabin features such as air, music, lighting, touch-screen display components (such as those used in connection with navigation systems), and the like.

The data storage device 32 stores data for use in automatically controlling the vehicle 10. In various embodiments, the data storage device 32 stores defined maps of the navigable environment. In various embodiments, the defined maps may be predefined by and obtained from a remote system. For example, the defined maps may be assembled by the remote system and communicated to the vehicle 10 (wirelessly and/or in a wired manner) and stored in the data storage device 32. Route information may also be stored within data device 32—i.e., a set of road segments (associated geographically with one or more of the defined maps) that together define a route that the user may take to travel from a start location (e.g., the user's current location) to a target location. Also, the data storage device 32 stores data pertaining to roadways on which the vehicle 10 may be travelling. As will be appreciated, the data storage device 32 may be part of the automated system controller 34, separate from the automated system controller 34, or part of the automated system controller 34 and part of a separate system.

The automated system controller 34 includes at least one automated system processor 44 and an automated system computer-readable storage device or media 46. The automated system processor 44 may be a custom-made or commercially available processor, a central processing unit (CPU), a graphics processing unit (GPU), an auxiliary processor among several processors associated with the automated system controller 34, a semiconductor-based microprocessor (in the form of a microchip or chip set), a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the automated system processor 44 is powered down. The computer-readable storage device or media 46 may be implemented using a number of known memory devices such as PROMs (programmable read-only memory), EPROMs (electrically PROM), EEPROMs (electrically erasable PROM), flash memory, or other electric, magnetic, optical, or combination memory devices capable of storing data, some of which represent executable instructions, used by the automated system controller 34 in controlling the vehicle 10. The automated system controller 34 may be simply referred to as the controller.

The instructions may include one or more separate programs, each of which comprises an ordered listing of executable instructions for implementing logical functions. The instructions, when executed by the automated system processor 44, receive and process signals from the sensor system 28, perform logic, calculations, methods and/or algorithms for automatically controlling the components of the vehicle 10, and generate control signals that are transmitted to the actuator system 30 to automatically control the components of the autonomous vehicle 10 based on the logic, calculations, methods, and/or algorithms. Although only one automated system controller 34 is shown in FIG. 1, embodiments of the autonomous vehicle 10 may include a number of controllers 34 that communicate over suitable communication medium or a combination of communication mediums and that cooperate to process the sensor signals, perform logic, calculations, methods, and/or algorithms, and generate control signals to automatically control features of the autonomous vehicle 10. In one embodiment, as discussed in detail below, the automated system controller 34 is configured for use in controlling maneuvers for the vehicle 10 around stationary vehicles.

Figure 2:
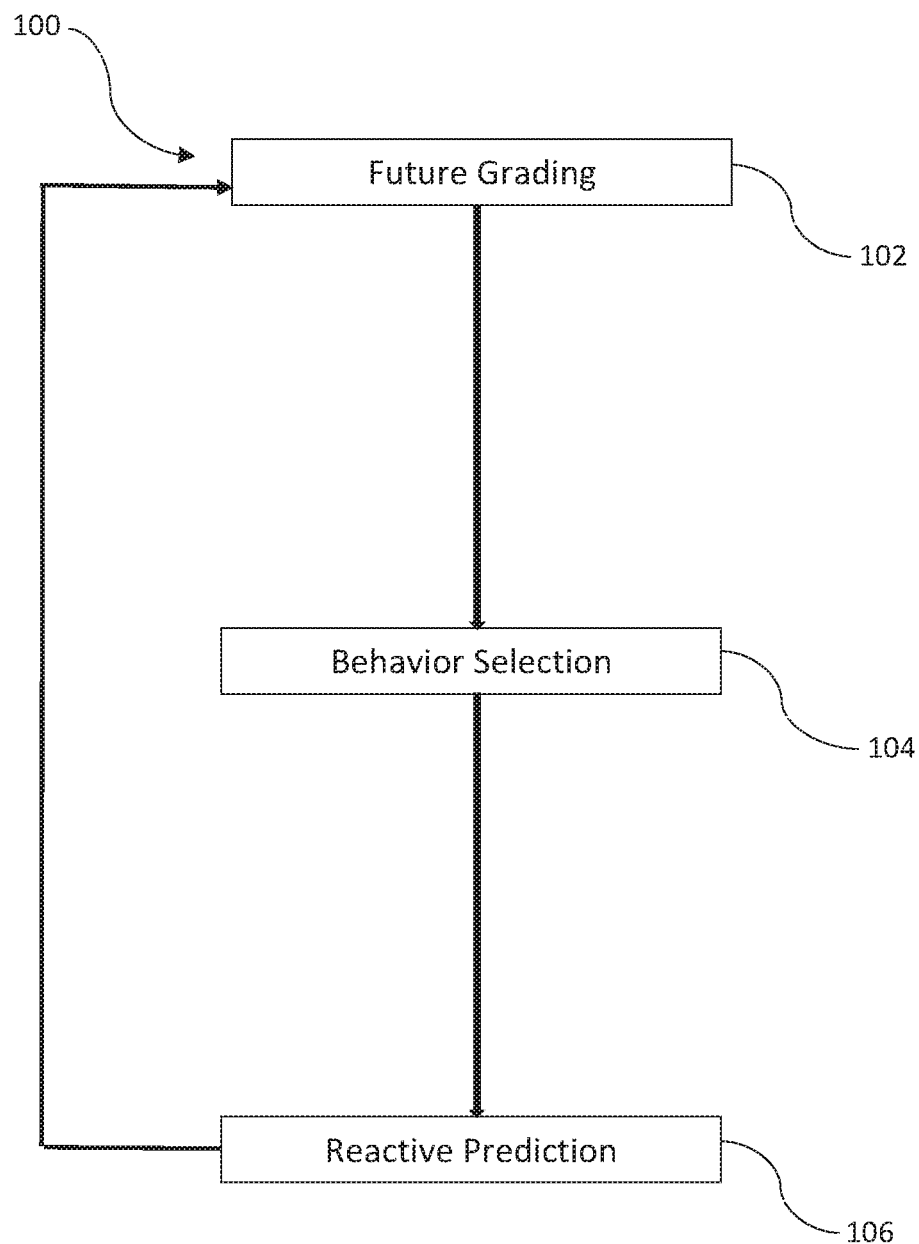
FIG. 2 is a flowchart of a method for controlling an autonomous vehicle.

The communication system 36 is configured to wirelessly communicate information to and from other entities 48, such as but not limited to, other vehicles ("V2V" communication), infrastructure ("V2I" communication), remote transportation systems, and/or user devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. The communication system 36 is configured to transmit and receive a traffic-related message as described below.

The electronic power steering system 24 may additionally include a steering controller 35. The steering controller 35 includes at least one steering processor 45 and a steering computer-readable storage device or media 47. The steering processor 45 may be a custom-made processor, a central processing unit (CPU), a graphics processing unit (GPU), an auxiliary processor among several processors associated with the steering controller 35, a semiconductor-based microprocessor (in the form of a microchip or chip set), a combination thereof, or generally a device for executing instructions. The steering computer readable storage device or media 47 may include volatile and nonvolatile storage in read-only memory (ROM), random-access memory (RAM), and keep-alive memory (KAM), for example. KAM is a persistent or non-volatile memory that may be used to store various operating variables while the steering processor 45 is powered down. The steering computer-readable storage device or media 47 may be implemented using a number of known memory devices such as PROMs (programmable read-only memory), EPROMs (electrically PROM), EEPROMs (electrically erasable PROM), flash memory, or other electric, magnetic, optical, or combination memory devices capable of storing data, some of which represent executable instructions, used by the steering controller 35 in controlling the electronic power steering system 24 of the autonomous vehicle 10.

FIG. 2 illustrates a flowchart of a forward modeling method 100 for behavior control of the autonomous vehicle 10. Forward modeling is a general prediction approach, wherein the automated system controller 34 makes a future prediction based on another short-term prediction. In the present disclosure, the forward modeling is systematically formalized by introducing three components (i.e., future grading 102, behavior selection 104, and reactive prediction 106).

The method 100 begins at block 102, which entails future grading. Future grading involves scoring driving behavior for a future hypothetical situation. To do so, the automated system controller 34 first receives sensor input from one or more of the sensors (i.e., sensing devices 40a-40n) of the autonomous vehicle 10. The sensor input from the sensing devices 40a-40n may include, but are not limited to, the speed of the autonomous vehicle 10, the distance from the autonomous vehicle to another object, a presence of a stop sign along a planned vehicle route, the distance from the autonomous vehicle 10 to a stop sign along a planned route, a presence of a pedestrian along a planned route, and the distance from the autonomous vehicle 10 to the pedestrian. For instance, a camera (i.e., one of the sensing devices 40a-40n) may be used to detect a pedestrian, a stop sign, or another object, such as another vehicle. A lidar (i.e., one of the sensing devices 40a-40n) may be used to measure the distance from the autonomous vehicle 10 and another object, such as a stop sign or a pedestrian. The automated system controller 34 may also receive input from the vehicle operator through the user-interface 13. For example, the vehicle operator may input information about the designated destination. Also, the automated system controller 34 may receive input from the navigation system about maps and routes to reach the designated destination. Further, the automated system controller 34 may receive input from other entities 48 through the communication system 36. For example, the automated system controller 34 may receive input about the location of another vehicle or traffic infrastructure, such as a traffic light.

Then, also at block 102, the automated system controller 34 determines, using more than one autonomous driving technique, a plurality of possible planned movements of the autonomous vehicle 10 in a future based at least on the sensor input from the plurality of sensors (i.e., sensing devices 40a-40n). The autonomous driving techniques that may be used include one or more rule-based models and/or machine-learning models, such a machine-learning tree-regression mode. A rule-based model is based on specific rules programmed into the automated system controller 34. For instance, one rule in the rule-based model may dictate that the autonomous vehicle 10 should be at least a predetermined distance spaced apart from other entities 48, such as another vehicle. Another rule in the rule-based model may be that the speed of the autonomous vehicle 10 may not exceed the speed limit in the particular road where the autonomous vehicle 10 is located. One or more rule-based model may be used to determine at least one possible planned movements based on the input from the sensing devices 40a-40n and the user designated destination. The machine learning models rely on statistical models that the automated system controller 34 uses to command the autonomous vehicle 10 to perform a specific task without using explicit instructions, relying on patterns and inference instead. For example, the automated system controller 34 may employ decision tree learning (i.e., one of the multiple possible machine learning models) to obtain at least one possible planned movement in the future. For instance, classification and tree regression (CART) models may be used to determine planned movements for the autonomous vehicle 10. The possible planned movements are planned movements that will occur in the future. In the present disclosure, "the future" means 3.5 seconds ahead of the current time, thereby providing the automated system controller 34 enough time to grade all of the possible planned movements. The possible planned movements may include, for example, a left turn.

Also, at block 102, after determining the possible planned movements in the future using a number of the autonomous driving techniques, the automated system controller 34 grades each of the plurality of possible planned movements to obtain a plurality of scores. Each score corresponds to one of the plurality of possible planned movements. Specifically, the automated system controller 34 determines one possible planned movement per each autonomous driving technique. Then, each of the possible planned movements is graded and a score is assigned to each of the possible planned movements.

Grading each of the possible planned movements may entail assigning a partial score to different vehicle parameters to obtain a plurality of partial movement scores for each of the plurality of possible planned movements. For instance, a partial score may be assigned to the following, namely: (1) each of the speed of the autonomous vehicle 10 for each of the plurality of planned movements; (2) the distance from the autonomous vehicle 10 to another entity 48 (e.g., another vehicle) for each of the plurality of planned movements; (3) the presence of a stop sign (or another traffic infrastructure) for each of the plurality of planned movements; (4) the distance from the autonomous vehicle 10 to the stop sign (or other traffic infrastructure) for each of the plurality of planned movements; (4) the presence of a pedestrian along the route for each of the plurality of planned movements; and/or (5) the distance from the autonomous vehicle 10 to the pedestrian along the route for each of the plurality of possible planned movements in order to obtain a plurality of partial movement scores for each of the plurality of possible planned movements. For example, if one of the possible planned movements requires a higher speed than another possible planned movement, then the possible planned movement with the lowest speed is assigned a higher partial score than other possible planned movements.

For instance, if the distance from the autonomous vehicle 10 in one possible planned movement to another entity 48 is less than in other possible planned movements, then the possible planned movement with the lowest distance from the autonomous vehicle 10 to the other entity 48 has a higher partial score than other possible planned movements. If one of the possible planned movements involves the presence of a pedestrian along the planned route, then such possible planned movement has a lower score than other planned movements with no pedestrian along the planned route. If the distance from the autonomous vehicle 10 to the pedestrian in one of the possible planned movements is greater than in other possible planned movements, then the partial score for such possible planned movement is a higher partial score than other possible planned movements wherein the distance from the autonomous vehicle 10 to the pedestrian is less. If a stop sign (or other traffic infrastructure) is along the route of a possible planned movement, then such possible planned movement is assigned a lower partial score than other possible planned movements with no stop sign (or other traffic infrastructure) along the possible planned route. If the distance from the autonomous vehicle 10 to the stop sign (or other traffic infrastructure) in one possible planed movement is greater than in other possible planned movements, then the possible planned movement with the largest distance between the stop sign (or other traffic infrastructure) and the autonomous vehicle 10 has a higher partial score than other possible planned movements where the distance from the stop sign (or other traffic infrastructure) is less. All the partial scores are then added to determine the score for each possible planned movement. Therefore, the score of each of the possible planned movements is a function of all of the partial scores described above. It is contemplated that the automated system controller 34 may use additional vehicle parameters each being assigned a partial score. Alternatively, the automated system controller 34 may use fewer or different vehicle parameters than the vehicle parameters described above. After determining the scores, then the method 100 proceeds to block 104.

At block 104, the automated system controller 34 performs a behavior selection. To this end, the automated system controller 34 identifies and selects the possible planned movement that has the highest score. In doing so, the automated system controller 34 compares the scores of all of the possible planned movements determined using the different autonomous driving techniques in order to determine which of the autonomous driving techniques renders the highest score. For example, the automated system controller 34 may compare the score of the possible planned movement determined using a rule-base model with the score of the possible planned movement determined using a machine-learning model to determine which of these one autonomous driving techniques (i.e., rule-based model vs. machine learning model) results in the highest score. The possible planned movement with the highest score is selected.

After executing block 104, the method 100 then proceeds to block 106. In one scenario, the automated system controller 34 commands the autonomous vehicle 10 to perform the possible planned movement with the highest score as determined at this stage. However, as discussed below, the reactive prediction (at block 106) may be considered before commanding the autonomous vehicle 10 to perform a specific action.

At block 106, the automated system controller 34 determines reactive prediction movements of other vehicles (or other entities 48) based on the selected possible planned movement of the autonomous vehicle 10. The reactive movements of other vehicles (or other entities 48) refers to the movements of other vehicles in reaction to the selected possible planned vehicle of the autonomous vehicle 10 as determined in block 104. In doing so, the automated system controller 34 determines a multiple of possible reactive movements of one or more other vehicles based on the selected possible planned movements. Then, the automated system controller 34 determines a plurality of possible reactive movements of the autonomous vehicle 10 in the future (e.g., 3.5 seconds ahead of the current time) based on the predicted movement of the other vehicle or vehicles.

In one scenario, the automated system 34 commands the autonomous vehicle 10 to change from a first lane to an adjacent, second lane because a first vehicle is traveling slow ahead in the first lane. However, a second vehicle is driving on the second lane behind the autonomous vehicle 10. As a consequence, the automated system controller 34, using for example a kinematic model, determines that the second vehicle will slow down when the autonomous vehicle 10 changes lane. In other words, the automated system controller 34 predicts the behavior of the second vehicle.

In response to determining the possible reactive movements of the other vehicles, the method 100 proceeds to block 102, where the automated system controller 34 modifies the possible planned movements by taking into account the reactive prediction movements of other vehicles and using the sensor input from the sensing devices 40a-40n and the autonomous driving techniques (e.g., rule-based model and machine-learning models). As a consequence, the automated system controller 34 generates a plurality of modified planned movements of the autonomous vehicle 10 in the future (e.g., 3.5 seconds ahead of the current time). As explained above, these modified planned movements of the autonomous vehicle 10 take into account the possible reactive movements of the other vehicles.

The method 100 then proceeds to block 104 where the plurality of modified planned movements of the autonomous vehicle 10 are graded again (i.e., regraded) to obtain a plurality of updated scores each corresponding to one of the plurality of modified planned movements as discussed above. The method 100 then proceeds to block 104, where the automated system controller 34 selects the modified planned movement that has the highest updated score. Also, the automated system controller 34 commands the autonomous vehicle 10 to move according to the selected modified planned movement with the highest updated score. To do so, the automated controller system 34 commands the actuation of one or more actuator devices 42*a*, 42*b*, and 42*n* that control one or more vehicle features of the autonomous vehicle 10.

While the best modes for carrying out the teachings have been described in detail, those familiar with the art to which this disclosure relates will recognize various alternative designs and embodiments for practicing the teachings within the scope of the appended claims. The vehicle 10 illustratively disclosed herein may be suitably practiced in the absence of any element which is not specifically disclosed herein. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. The phrase "at least one of" as used herein should be construed to include the non-exclusive logical "or", i.e., A and/or B and so on depending on the number of components.

What is claimed is:

1. A method for controlling an autonomous vehicle, comprising:

receiving, by a controller of the autonomous vehicle, a sensor input from a plurality of sensors of the autonomous vehicle;

determining a plurality of possible planned movements of the autonomous vehicle in a future using a plurality of autonomous driving techniques and the sensor input from the plurality of sensors, wherein the plurality of autonomous driving techniques includes a rule-based model and a machine-learning model, the plurality of possible planned movements includes a first possible planned movement determined using the rule-based model, and the plurality of possible planned movements includes a second possible planned movement determined using the machine-learning model;

grading each of the plurality of possible planned movements to obtain a plurality of scores each corresponding to one of the plurality of possible planned movements, wherein the plurality of scores includes a highest score, the plurality of scores includes a first score corresponding to the first possible planned movement determined using the rule-based model, the plurality of scores includes a second score corresponding to the second possible planned movement determined using the machine-learning model, and grading each of the plurality of possible planned movements includes:

grading the first possible planned movement that was determined using the rule-based model to obtain the first score;

grading the second possible planned movement that was determined using the machine-learning model to obtain the second score;

comparing the first score of the first possible planned movement that was determined using the rule-base model with the second score of the second possible planned movement that was determined using the machine-learning model to determine which of the plurality of autonomous driving techniques results in the highest score;

selecting one of the plurality of possible planned movements that corresponds with the highest score of the plurality of scores;

determining a predicted movement of at least one other vehicle based on the selected one of the plurality of possible planned movements;

determining a plurality of possible reactive movements of the autonomous vehicle in the future based on the predicted movement of the at least one other vehicle;

modifying the plurality of possible planned movements to include the plurality of possible reactive movements to obtain a plurality of modified planned movements in the future;

regrading each of the plurality of modified planned movements to obtain a plurality of updated scores each corresponding to one of the plurality of modified planned movements, wherein the plurality of updated scores includes a highest updated score;

selecting one of the plurality of modified planned movements that corresponds with the highest updated score of the plurality of scores; and commanding, by the controller, the autonomous vehicle to move according to the selected one of the plurality of modified planned movements with the highest updated score.

2. The method of claim 1, wherein the machine-learning model is a classification and tree regression (CART) model.

3. The method of claim 1, wherein grading each of the possible planned movements includes determining a speed of the autonomous vehicle for each of the plurality of possible planned movements, a distance from the autonomous vehicle to another object for each of the plurality of possible planned movements, a presence of a stop sign for each of the plurality of possible planned movements, a distance from the autonomous vehicle to the stop sign for each of the plurality of possible planned movements, a presence of a pedestrian for each of the plurality of possible planned movements, and a distance from the autonomous vehicle to the pedestrian for each of the plurality of possible planned movements.

4. The method of claim 3, wherein grading each of the possible planned movements includes assigning a partial score to each of the speed of the autonomous vehicle for each of the plurality of possible planned movements, the distance from the autonomous vehicle to another object for each of the plurality of possible planned movements, the presence of the stop sign for each of the plurality of possible planned movements, the distance from the autonomous vehicle to the stop sign for each of the plurality of possible planned movements, the presence of a pedestrian for each of the plurality of possible planned movements, and the distance from the autonomous vehicle to the pedestrian for each of the plurality of possible planned movements in order to obtain a plurality of partial movement scores for each of the plurality of possible planned movements.

5. The method of claim 4, wherein each of the plurality of scores is equal to a sum of all of the plurality of partial movement scores.

6. The method of claim 5, wherein regrading each of the plurality of possible planned movements includes determining an updated speed of the autonomous vehicle for each of the plurality of modified planned movements, an updated distance from the autonomous vehicle to another object for each of the plurality of modified planned movements, an updated presence of a stop sign for each of the plurality of modified planned movements, an updated distance from the autonomous vehicle to the stop sign for each of the plurality of modified planned movements, an updated presence of a pedestrian for each of the plurality of modified planned movements, and an updated distance from the autonomous vehicle to the pedestrian for each of the plurality of modified planned movements.

7. The method of claim 6, wherein regrading each of the possible modified movements includes assigning an updated partial score to each of the updated speed of the autonomous vehicle for each of the plurality of modified planned movements, the updated distance from the autonomous vehicle to another object for each of the plurality of modified planned movements, the updated presence of the stop sign for each of the plurality of modified planned movements, the updated distance from the autonomous vehicle to the stop sign for each of the plurality of modified planned movements, the updated presence of a pedestrian for each of the plurality of modified planned movements, and the updated distance from the autonomous vehicle to the pedestrian for each of the plurality of modified planned movements in order to obtain a plurality of partial modified scores for each of the plurality of modified planned movements.

8. The method of claim 1, wherein the future is 3.5 seconds ahead of a current time.

9. The method of claim 1, wherein the predicted movement of at least one other vehicle is determined using a kinematic prediction model.

10. A control system for an autonomous vehicle, comprising:
a plurality of sensors;
a controller in communication with the plurality of sensors, wherein the controller is programmed to:
receive input from a plurality of sensors of the autonomous vehicle;
determine a plurality of possible planned movements of the autonomous vehicle in a future using a plurality of autonomous driving techniques and input from the plurality of sensors, wherein the plurality of autonomous driving techniques includes a rule-based model and a machine-learning model, the plurality of possible planned movements includes a first possible planned movement determined using the rule-based model, and the plurality of possible planned movements includes a second possible planned movement determined using the machine-learning model;
grade each of the plurality of possible planned movements to obtain a plurality of scores each corresponding to one of the plurality of possible planned movements, wherein the plurality of scores includes a highest score, the plurality of scores includes a first score corresponding to the first possible planned movement determined using the rule-based model, the plurality of scores includes a second score corresponding to the second possible planned movement determined using the machine-learning model, and the controller is programmed to:
grade the first possible planned movement that was determined using the rule-based model to obtain the first score;
grade the second possible planned movement that was determined using the machine-learning model to obtain the second score;
compare the first score of the first possible planned movement that was determined using the rule-base model with the second score of the second possible planned movement that was determined using the machine-learning model to determine which of the plurality of autonomous driving techniques results in the highest score;
select one of the plurality of the possible planned movements that corresponds with the highest score of the plurality of scores;
determine a predicted movement of at least one other vehicle based on the selected one of the plurality of possible planned movements;
determine a plurality of possible reactive movements of the autonomous vehicle in the future based on the predicted movement of the at least one other vehicle;
modify the plurality of possible planned movements to include the plurality of possible reactive movements to obtain a plurality of modified planned movements in the future;
regrade each of the plurality of modified planned movements to obtain a plurality of updated scores each corresponding to one of the plurality of modified planned movements, wherein the plurality of updated scores includes a highest updated score; and
select one of the plurality of modified planned movements that corresponds with the highest updated score of the plurality of scores; and
command the autonomous vehicle to move according to the selected one of the plurality of modified planned movements with the highest updated score.

11. The control system of claim 10, wherein machine-learning model is a classification and tree regression (CART) model.

12. The control system of claim 10, wherein the controller grades each of the possible planned movements by determining a speed of the autonomous vehicle for each of the plurality of possible planned movements, a distance from the autonomous vehicle to another object for each of the plurality of possible planned movements, a presence of a stop sign for each of the plurality of possible planned movements, a distance from the autonomous vehicle to the stop sign for each of the plurality of possible planned movements, a presence of a pedestrian for each of the plurality of possible planned movements, and a distance from the autonomous vehicle to the pedestrian for each of the plurality of possible planned movements.

13. The control system of claim 12, wherein the controller grades each of the possible planned movements by assigning a partial score to each of the speed of the autonomous vehicle for each of the plurality of possible planned movements, the distance from the autonomous vehicle to another object for each of the plurality of possible planned movements, the presence of the stop sign for each of the plurality of possible planned movements, the distance from the autonomous vehicle to the stop sign for each of the plurality of possible planned movements, the presence of a pedestrian for each of the plurality of possible planned movements, and the distance from the autonomous vehicle to the pedestrian for each of the plurality of possible planned movements in order to obtain a plurality of partial movement scores for each of the plurality of possible planned movements.

14. The control system of claim 13, wherein each of the plurality of scores is equal to a sum of all of the plurality of partial movement scores.

15. The control system of claim 14, wherein regrading each of the plurality of possible planned movements includes determining an updated speed of the autonomous vehicle for each of the plurality of modified planned movements, an updated distance from the autonomous vehicle to another object for each of the plurality of modified planned movements, an updated presence of a stop sign for each of the plurality of modified planned movements, an updated distance from the autonomous vehicle to the stop sign for each of the plurality of modified planned movements, an updated presence of a pedestrian for each of the plurality of modified planned movements, and an updated distance from the autonomous vehicle to the pedestrian for each of the plurality of modified planned movements.

16. The control system of claim 15, wherein regrading each of the possible modified movements includes assigning an updated partial score to each of the updated speed of the autonomous vehicle for each of the plurality of modified planned movements, the updated distance from the autonomous vehicle to another object for each of the plurality of modified planned movements, the updated presence of the stop sign for each of the plurality of modified planned movements, the updated distance from the autonomous vehicle to the stop sign for each of the plurality of modified planned movements, the updated presence of a pedestrian for each of the plurality of modified planned movements, and the updated distance from the autonomous vehicle to the pedestrian for each of the plurality of modified planned movements in order to obtain a plurality of partial modified scores for each of the plurality of modified planned movements.

17. The control system of claim 10, wherein the future is 3.5 seconds ahead of a current time.

18. The control system of claim 10, wherein the predicted movement of at least one other vehicle is determined using a kinematic prediction model.

* * * * *